US012797993B2

(12) United States Patent
Lizotte et al.

(10) Patent No.: US 12,797,993 B2
(45) Date of Patent: Nov. 17, 2026

(54) WELDING TORCH CONSUMABLES CLEANING SYSTEMS

(71) Applicant: ILLINOIS TOOL WORKS INC., Glenview, IL (US)

(72) Inventors: Ryan Lizotte, Ontario (CA); Tiejun Ma, Ontario (CA); Bradley Eugene Whipple, Windsor (CA)

(73) Assignee: Illinois Tool Works Inc., Glenview, IL (US)

(*) Notice: Subject to any disclaimer, the term of this patent is extended or adjusted under 35 U.S.C. 154(b) by 88 days.

(21) Appl. No.: 18/589,759

(22) Filed: Feb. 28, 2024

(65) Prior Publication Data

US 2024/0326151 A1 Oct. 3, 2024

Related U.S. Application Data

(60) Provisional application No. 63/455,739, filed on Mar. 30, 2023.

(51) Int. Cl.
*B23K 9/32* (2006.01)
*B23K 9/095* (2006.01)
(Continued)

(52) U.S. Cl.
CPC ............ *B23K 9/328* (2013.01); *B23K 9/0956* (2013.01); *B25J 11/005* (2013.01); *B25J 13/086* (2013.01); *B25J 13/087* (2013.01); *B25J 19/023* (2013.01)

(58) Field of Classification Search
CPC .... B23K 9/328; B23K 9/0956; B23K 9/0953; B23K 9/32; B25J 11/005; B25J 13/086; B25J 13/087; B25J 19/023
See application file for complete search history.

(56) References Cited

U.S. PATENT DOCUMENTS 4,146,924 A * 3/1979 Birk ........................ B25J 9/1692 318/568.14
4,247,751 A * 1/1981 Ashton .................. B23K 9/125 219/130.31
(Continued)

FOREIGN PATENT DOCUMENTS

CN 106964907 A * 7/2017 ............. B23K 26/70
CN 114192582 A * 3/2022 .............. F26B 21/50
(Continued)

OTHER PUBLICATIONS

"Robotic arc welding with on-line process monitoring based on the LMM analysis of the welding process stability;" Bai et al.; 2016 IEEE International Conference on Advanced Intelligent Mechatronics (AIM) (2016, pp. 566-571); Sep. 26, 2016. (Year: 2016).*
(Continued)

*Primary Examiner* — Khoi H Tran
*Assistant Examiner* — Jorge O Peche
(74) *Attorney, Agent, or Firm* — McAndrews, Held & Malloy, Ltd.

(57) ABSTRACT

An system for maintenance of consumables of a welding torch includes: one or more sensors configured to monitor one or more conditions of one or more consumables of the welding torch; and control circuitry configured to: receive feedback corresponding to the one or more conditions of the one or more consumables from the one or more sensors; compare the feedback to one or more thresholds corresponding to the one or more conditions; and command the system to perform a cleaning operation on the one or more consumables based on the comparison.

12 Claims, 10 Drawing Sheets

(51) Int. Cl.

| | |
|---|---|
| ***B25J 11/00*** | (2006.01) |
| ***B25J 13/08*** | (2006.01) |
| ***B25J 19/02*** | (2006.01) |

(56) References Cited

U.S. PATENT DOCUMENTS 4,595,820 A * 6/1986 Richardson .......... B23K 9/0956 219/130.21
4,951,218 A * 8/1990 Okumura ............. B23K 9/0956 901/42
5,304,768 A * 4/1994 Ishizaka ................. B23K 11/24 219/110
5,404,225 A * 4/1995 Bushman ............... G02B 23/18 359/371
6,074,504 A * 6/2000 Yu ....................... B29C 66/9161 156/304.6
6,295,708 B1 * 10/2001 Spaid ..................... B23K 9/328 29/81.02
6,652,691 B1 * 11/2003 Yu ....................... B29C 66/4324 156/304.6
6,857,570 B2 * 2/2005 Tsikos ................ G02B 19/0085 235/472.01
6,995,841 B2 * 2/2006 Scott ..................... G01J 3/4406 356/417
8,129,652 B2 * 3/2012 Hampton ................. B23K 9/10 219/137.2
9,821,399 B1 * 11/2017 Vigdal ................. B23K 26/342
9,833,857 B2 * 12/2017 Artelsmair ........... B23K 9/0953
10,857,677 B2 * 12/2020 Hammar ................ B25J 9/0009
12,330,298 B2 * 6/2025 Mitchell ................ B25J 9/1687
12,343,825 B2 * 7/2025 Erndt ................... B23K 9/0671
2001/0045755 A1 * 11/2001 Schick ................. B25J 15/0061 294/907
2004/0238511 A1 * 12/2004 Matus .................... B23K 9/167 219/130.4
2005/0011865 A1 * 1/2005 Jeon ..................... B23K 11/309 219/86.25
2006/0065284 A1 * 3/2006 Langeder ............... B23K 9/328 134/1
2007/0073439 A1 * 3/2007 Habibi ............... G05B 19/4182 700/213
2007/0075048 A1 * 4/2007 Kunisaki ............ G05B 19/4083 219/91.1
2007/0257015 A1 * 11/2007 Fosbinder ............ B23K 9/1062 219/130.21
2008/0149608 A1 * 6/2008 Albrecht .............. B23K 9/0956 219/136
2008/0264915 A1 * 10/2008 Manthe ................ B23K 9/0673 219/130.31
2009/0107960 A1 * 4/2009 Hampton ............. B23K 9/0956 219/74
2012/0138586 A1 * 6/2012 Webster ................ B22F 10/366 219/121.64
2012/0200695 A1 * 8/2012 Yamane ............. B23K 11/3063 348/90
2013/0327746 A1 * 12/2013 Hemmert ................. B23K 9/28 219/124.1
2014/0251968 A1 * 9/2014 Peters .................. B23K 9/0738 219/130.21
2014/0333756 A1 * 11/2014 Sogo ..................... B23K 11/115 348/90
2015/0048059 A1 * 2/2015 Kurosawa ............ B23K 26/144 219/76.14
2015/0321292 A1 * 11/2015 Albrecht .............. B23K 9/0956 219/121.63
2016/0001391 A1 * 1/2016 Nacey .................. B23K 31/125 219/137 R
2016/0375524 A1 * 12/2016 Hsu ........................ B23K 37/00 228/8
2017/0120337 A1 * 5/2017 Kanko ............... B23K 15/0013
2017/0157693 A1 * 6/2017 Albrecht .............. B23K 9/0956
2017/0200395 A1 * 7/2017 Albrecht ............... G06F 3/0488
2018/0015571 A1 * 1/2018 Wang ...................... G06T 7/136
2018/0029154 A1 * 2/2018 Rajagopalan ........ B23K 9/0286
2018/0031152 A1 * 2/2018 Rajagopalan ............. F16L 9/02
2018/0117718 A1 * 5/2018 Rajagopalan ........ B23K 9/0284
2018/0140197 A1 * 5/2018 Wang ................... A61B 5/0077
2019/0168333 A1 * 6/2019 Denis ................... B23K 9/1087
2020/0108508 A1 * 4/2020 Hammar .............. G05B 19/402
2020/0125062 A1 * 4/2020 Inoue ................... G05B 19/401
2020/0346298 A1 * 11/2020 Uecker .................. B23K 9/133
2020/0353620 A1 * 11/2020 Hasunuma ............. B25J 19/023
2021/0031374 A1 * 2/2021 Koga ..................... B25J 9/1687
2021/0046569 A1 * 2/2021 Singh ................... B23K 9/0026
2021/0094120 A1 * 4/2021 Forrest ............. G05B 19/41875
2021/0237212 A1 * 8/2021 Saez .................... B23K 31/003
2021/0268657 A1 * 9/2021 Yomoda ............. G05B 19/4155
2022/0066414 A1 * 3/2022 Holverson .............. H04W 4/80
2022/0143730 A1 * 5/2022 Massey, Jr. .......... B23K 9/1006
2022/0250183 A1 * 8/2022 Knoener ................ B25J 19/023
2022/0305585 A1 * 9/2022 Wakisaka ........... B23K 26/0869
2022/0379477 A1 * 12/2022 Albrecht ................ B25J 11/005
2023/0186454 A1 * 6/2023 Williams .............. G06T 7/0004 382/141
2024/0181567 A1 * 6/2024 Hillig .................. B23K 26/342
2024/0189938 A1 * 6/2024 Webster ................. G01B 11/22
2024/0269760 A1 * 8/2024 Lickiss .................. B25J 9/1679
2024/0326151 A1 * 10/2024 Lizotte ................... B25J 19/023
2024/0342819 A1 * 10/2024 Smith .................. B23K 9/0953
2025/0205884 A1 * 6/2025 Yoshida ................. B25J 9/1684

FOREIGN PATENT DOCUMENTS

| | | | | | |
|---|---|---|---|---|---|
| CN | 118720529 | A | * | 10/2024 | ......... B23K 37/0252 |
| CN | 118720530 | A | * | 10/2024 | ......... B23K 37/0252 |
| DE | 19654316 | C1 | * | 12/1997 | ............. B23K 9/296 |
| DE | 19730557 | A1 | * | 1/1999 | ............... B23K 9/32 |
| GB | 2107471 | | | 4/1983 | |
| JP | H02224876 | A | * | 9/1990 | |
| JP | H05285653 | A | * | 11/1993 | |
| JP | 3337285 | | | 10/2002 | |
| JP | 4128726 | B2 | * | 7/2008 | |
| KR | 102114639 | | | 5/2020 | |
| KR | 102114639 | B1 | * | 5/2020 | ............... B23K 9/26 |
| WO | WO-2004103632 | A1 | * | 12/2004 | ............... B23K 9/32 |

OTHER PUBLICATIONS

"Robotic Arc Welding: Research in Sensory Feedback Control;" Cook et al., IEEE Transactions on Industrial Electronics (vol. IE-30, Issue: 3, 1983, pp. 252-268); Aug. 1, 1983. (Year: 1983).*

"An approach to an expert robot welding system;" Sicard et al., IEEE Transactions on Systems, Man, and Cybernetics (vol. 18, Issue: 2, 1988, pp. 204-222); Mar. 1, 1988. (Year: 1988).*

KR 102114639—Machine Translation (Year: 2020).*

European Examination Report Appln No. 24166033.1 dated Oct. 20, 2025.

European Office Communication with extended search report Appln No. 24166033.1 dated Nov. 22, 2024.

* cited by examiner

WELDING TORCH CONSUMABLES CLEANING SYSTEMS

BACKGROUND

Welding torch nozzles and other consumables, such as the contact tip, diffuser, and insulator, may accumulate spatter or other contamination during welding operations. Welding torch consumables cleaning improves the operational life of the welding torch consumables.

SUMMARY

Welding torch consumables cleaning systems are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
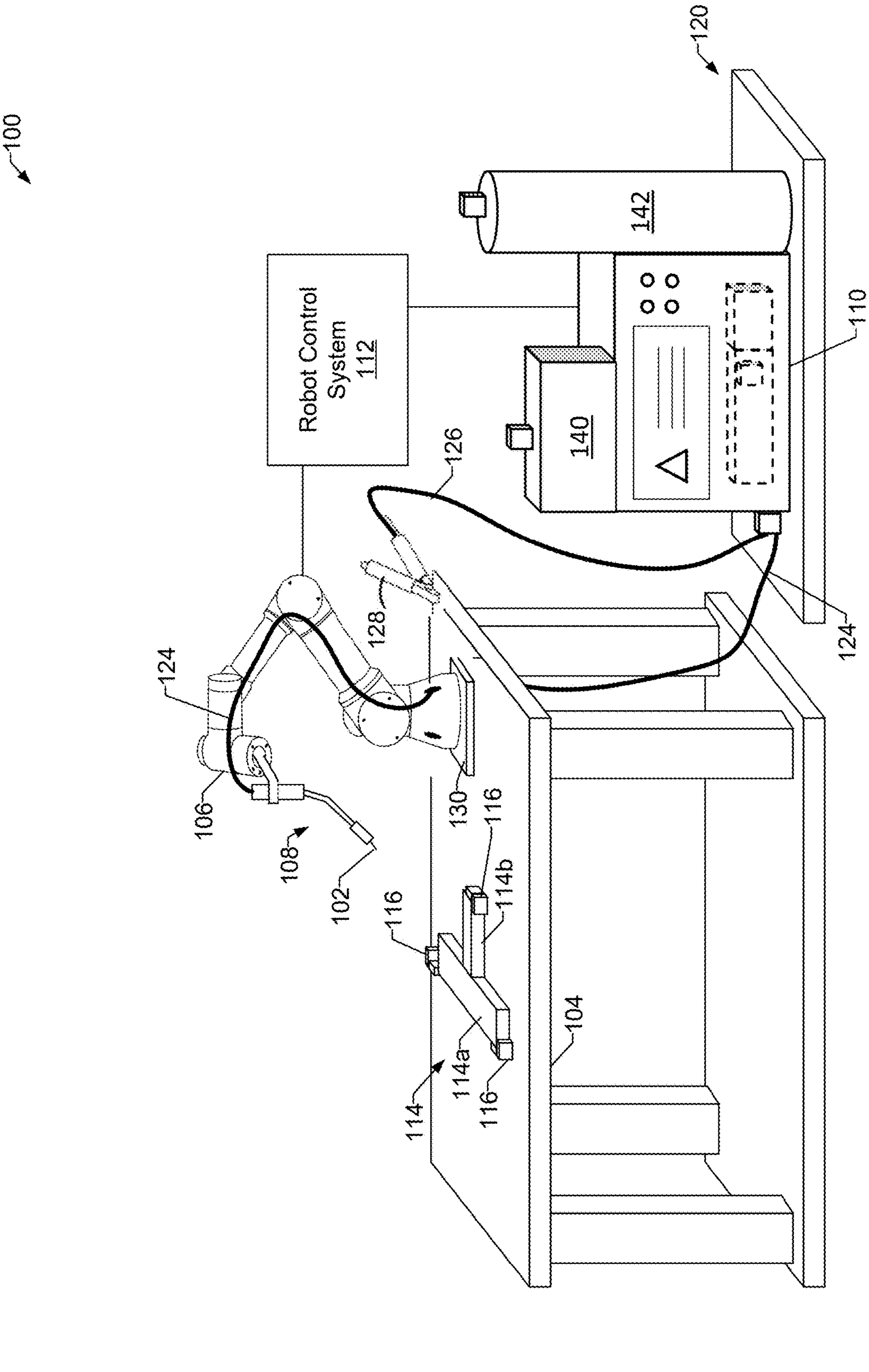
FIG. 1 illustrates an example robotic welding system to perform welding, including a robot control system, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Conventional robotic control systems typically clean welding torch consumables at a certain frequency, such as number of welding parts or number of welding cycles. Maintenance is then performed on the consumables by reamers and anti-spatter fluid sprayers to clean the consumables and slow the accumulation of spatter on the nozzle and other consumables of the torch, such as the gas diffuser, insulator, etc. Since cleaning of the consumables is time where welding cannot take place, reducing the amount of time that the welding torch is stopped to perform maintenance on the consumables should be minimized, in order to ensure that cleaning is only performed when actually needed.

Disclosed example cleaning systems, such as reamers and anti-spatter fluid spray systems, reduce the time involved in performing maintenance on welding consumables, reduce the complexity of the spray containment systems, and/or improve the effectiveness or performance of the spray containment system. Disclosed example welding consumables cleaning systems such as reamers and anti-spatter fluid sprayers increase the interval between maintenance compared with conventional torch reaming devices.

Disclosed example systems for cleaning consumables of a welding torch, comprising: one or more sensors configured to monitor one or more conditions of the one or more consumables of the welding torch; and control circuitry configured to: receive feedback corresponding to the one or more conditions of the one or more consumables from the one or more sensors; compare the feedback to one or more thresholds corresponding to the one or more conditions; and command the system to perform a cleaning operation on the one or more consumables based on the comparison. In some example systems, the control circuitry is further configured to command the system to perform a reaming process or a spatter removal process on the one or more consumables of the welding torch. In some example systems, the control circuitry is further configured to command the system to perform a reaming process followed by an anti-spatter application on the one or more consumables. Some example systems further include a memory configured to store values obtained by the one or more sensors and reference values for the one or more sensors.

In some example systems, the sensor is a camera configured to obtain one or more images, and the comparison comprises comparing values obtained from the one or more images of the one or more consumables to threshold values. In some example systems, the camera is further configured to obtain the one or more images at a predetermined frequency or based on a triggering event. In some example systems, the predetermined frequency is configured to be modified based on an observed collection rate. In some example systems, the triggering event comprises a part change, a gate opening or closing, or replacement of the one or more consumables.

In some example systems, the sensor is a camera configured to obtain one or more reference images, and the comparison comprises comparing one or more subsequent images of the one or more consumables to the one or more reference images to determine whether the one or more thresholds have been violated. In some example systems, the one or more sensors is a gas pressure sensor or a gas flow sensor configured to measure gas flow or gas pressure. In some example systems, the control circuitry is configured to command the cleaning operation if the gas flow or the gas pressure violates the one or more thresholds for a predetermined period of time. In some example systems, the gas pressure sensor or the gas flow sensor is located in a power pin, a cable, on a reaming apparatus, near the reaming apparatus, or near tooling.

In some example systems, the one or more sensors is a ferrous proximity switch or an inductive proximity sensor configured to detect spatter on the one or more consumables. In some example systems, the one or more thresholds is 0 to 10 volts. In some example systems, the one or more sensors is a contact sensor configured to detect a presence of spatter at the one or more consumables. In some example systems, the contact sensor comprises a switch, wherein the switch is closed based on the presence of the spatter.

Disclosed example welding systems include a welding torch including one or more welding consumables; one or more sensors configured to monitor one or more conditions of the one or more welding consumables; a cleaning system configured to perform a cleaning operation on the one or more welding consumables; and control circuitry configured to: receive feedback corresponding to the one or more conditions from the one or more sensors; compare the feedback to one or more thresholds corresponding to the one or more conditions; and command the cleaning system to perform the cleaning operation based on the comparison. In some example systems, the cleaning operation comprises a reaming process, a spraying process, or a spatter removal process on the one or more welding consumables.

Disclosed example robotic welding systems include a welding torch including one or more welding consumables; a cleaning system configured to perform a cleaning operation on the one or more welding consumables; one or more sensors configured to monitor one or more conditions of the one or more welding consumables; and robot control circuitry configured to: receive feedback corresponding to the one or more conditions from the one or more sensors; compare the feedback to one or more thresholds corresponding to the one or more conditions; and control the welding torch to perform the cleaning operation based on the comparison. In some example systems, the robot control circuitry is further configured to command the cleaning system to perform the cleaning operation on the one or more welding consumables.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As used herein, the term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process," or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program," "weld program," or welding procedure includes at least a set of welding parameters for controlling a weld. A welding program may further include other software, algorithms, processes, or other logic to control one or more welding-type devices to perform a weld.

Turning to the figures, FIG. 1 illustrates an example robotic welding system 100 to perform welding. The example robotic welding system 100 of FIG. 1 includes a welding table 104, a robotic manipulator 106 configured to manipulate a welding torch 108, a welding-type power supply 110, and a robot control system 112.

The welding table 104, robotic manipulator 106, the welding torch 108, the welding-type power supply 110, and/or the robot control system 112, and/or subgroups of these components, may be packaged together (e.g., pre-assembled, pre-calibrated) to provide rapid setup of the robotic welding system 100 for welding at the end-user location. The robotic welding system 100 may be used to make repetitive welds, to leverage the consistency and repeatability advantages of the robotic manipulator 106.

In the example of FIG. 1, a workpiece 114 is positioned on the welding table 104. The workpiece 114 may include multiple components 114*a*, 114*b* which are to be welded together at one or more joints. To provide consistency in arrangement of the workpiece components 114*a*, 114*b*, the robotic welding system 100 may further include fixtures 116 attached to the welding table 104. The fixtures 116 may guide the placement of the components 114*a*, 114*b*, which can be used to consistently place the multiple components 114*a*, 114*b*.

During a welding operation or welding procedure, the robotic welding system 100 manipulates the welding torch 108, such as the illustrated welding torch, to which power is delivered by the welding-type power supply 110 via a first conductor 124 and returned by way of a work cable 126 and a work clamp 128 coupled to the weld table 104. The welding equipment may further include, for example, a wire feeder 140, a source of shielding gas 142, and other accessories and/or equipment. Other accessories and/or equipment may include, for example, water coolers, fume extraction devices, one or more controllers, sensors, user interfaces, and/or communication devices (wired and/or wireless).

The example robotic welding system 100 is configured to form a weld using any known electric welding techniques. Example electric welding techniques include shielded metal arc welding (SMAW), MIG, flux-cored arc welding (FCAW), TIG, laser welding, sub-arc welding (SAW), stud welding, friction stir welding, and resistance welding. In some examples, the welding-type power supply 110 and/or other welding equipment are configured to support one or more, but fewer than all, types of welding processes. To change welding processes, the welding-type power supply 110, torch 108, and/or other welding equipment may be removed (e.g., disconnected and moved away from the robotic welding system 100) and replaced by a different welding-type power supply, torch, and/or other welding equipment that supports the desired welding process. To facilitate ease of movement, the example welding equipment may be mounted or attached to a cart 120 or other conveyance (e.g., ground conveyance, hanging conveyance, etc.). Additionally or alternatively, multiple different types of welding equipment (e.g., multiple power supplies having different capabilities, multiple torches, etc.) may be co-located (e.g., proximate to a same robotic manipulator 106, on a rack of equipment, etc.) to enable rapid reconfiguration of the robotic welding system 100.

The example robotic manipulator 106 may operate using any number of degrees of freedom to manipulate the welding torch 108. For example, the robotic manipulator 106 may include multiple joints, in which each joint has one or more degrees of freedom, to achieve multiple orientations for accessing one or more weld joints on the workpiece 114. The example robotic welding system may be contained within a weld cell that is protected against intrusion by operators during robot operations (e.g., welding operations and/or other movement by the robot). In some examples the robotic welding system 100 may also configured as a cobot (e.g., a computer-controlled robotic device designed to assist a human operator), has a controller or processor, as well as one or more sensors, that are configured to operate in a manner such that humans do not necessarily need to be excluded from the area in which the robotic manipulator 106 is operating. For example, the robotic manipulator 106 may rapidly detect and respond to collisions, may operate with reduced speed and/or joint torque and/or implement other features.

The robotic manipulator 106 may be coupled to the table 104 via a base 130. Once secured, the base 130 is fixed with respect to the table 104, and may serve as a reference for position and/or orientation for the robotic manipulator 106.

The example robotic manipulator 106 and/or the example robot control system 112 are configured to transmit commands, requests, data, and/or other messages and/or communications to the power supply 110 via one or more protocols. The robotic manipulator 106 and/or the robot control system 112 are further configured to receive responses, acknowledgments, data, and/or other messages and/or communications from the power supply 110 via the one or more protocols. Based on a robotic welding procedure, the robotic manipulator 106 and/or the robot control system 112 may communicate parameters to the power supply 110 for configuration according to the robotic welding procedure, and/or adjust the welding-type process based on the variables and/or other data obtained from the power supply 110 while performing welding operations. In addition to communication with the power supply 110, the robotic manipulator 106, and/or the robot control system 112, the power supply 110, the robotic manipulator 106, and/or the robot control system 112 may communicate with other welding equipment (e.g., a welding accessory, such as the wire feeder 140, a shielding gas supply valve, a welding wire preheating system, a fume extraction system) and/or other robotic equipment.

Figure 2:
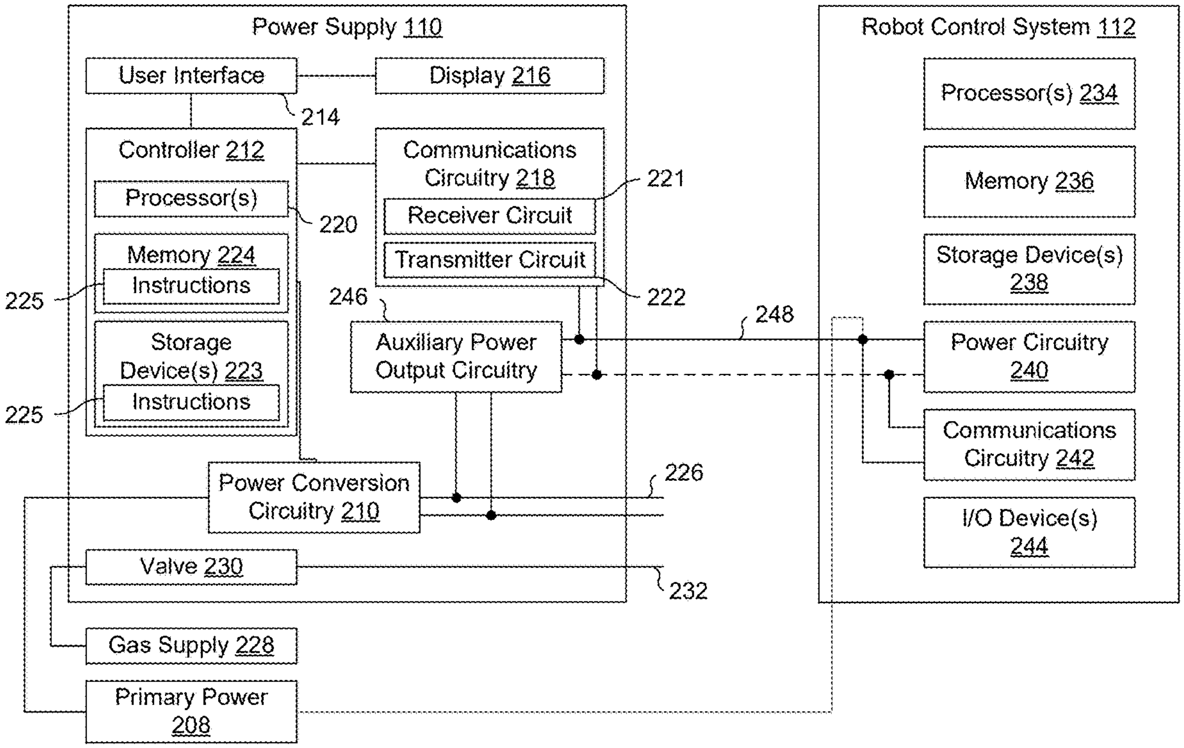
FIG. 2 illustrates an example block diagram of the robot control system, in accordance with aspects of this disclosure.

FIG. 2 is a block diagram of an example implementation of the welding-type power supply 110 and the robot control system 112 of FIG. 1. In some examples, the welding-type power supply 110 directly supplies input power to the welding torch 108. In the illustrated example, the welding-type power supply 110 is configured to supply power to welding operations and/or preheating operations. The example welding-type power supply 110 may also provide power to a wire feeder to supply electrode wire to the welding torch 108 for various welding applications (e.g., GMAW welding, flux core arc welding (FCAW)).

The welding-type power supply 110 receives primary power 208 (e.g., from the AC power grid, an engine/generator set, a battery, other energy generating or storage devices, an outside energy source, renewable energy source, or a combination thereof), conditions the primary power, and provides an output power to one or more welding devices and/or preheating devices in accordance with demands of the system. The primary power 208 may be supplied from an offsite location (e.g., the primary power may originate from the power grid). The welding-type power supply 110 includes a power conversion circuitry 210, which may include transformers, rectifiers, switches, and so forth, capable of converting the AC input power to AC and/or DC output power as dictated by the demands of the system (e.g., particular welding processes and regimes). The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the welding-type power supply 110 receives a converted auxiliary power output directly from a wall outlet. Any suitable power conversion system or mechanism may be employed by the welding-type power supply 110 to generate and supply both weld and auxiliary power.

The welding-type power supply 110 includes a controller 212 to control the operation of the welding-type power supply 110. The welding-type power supply 110 also includes a user interface 214. The controller 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the controller 212 controls operating parameters based on input by the user as well as based on other current operating parameters. Specifically, the user interface 214 may include a display 216 for presenting, showing, or indicating, information to an operator. The controller 212 may also include interface circuitry for communicating data to other devices in the system, such as the wire feeder, the robotic manipulator 106, and/or the robot control system 112. For example, in some situations, welding-type power supply 110 wirelessly communicates with other welding devices within the welding system. Further, in some situations, the welding-type power supply 110 communicates with other welding devices using a wired connection, such as by using a network interface controller (NIC) to communicate data via a network (e.g., ETHERNET, 10baseT, 10base100, etc.).

The controller 212 includes at least one controller or processor 220 that controls the operations of the welding-type power supply 110. The controller 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example controller 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application, data corresponding to sensor measurements, etc.), instructions (e.g., software or firmware to perform welding processes), images, and/or any other appropriate data. Examples of stored data for a welding application include an attitude (e.g., orientation) of a welding torch, a distance between the contact tip and a workpiece, a voltage, a current, welding device settings, and so forth. Examples of stored data corresponding to sensor measurements include thresholds or threshold ranges, captured images, uploaded images, current sensor values, previous sensor values, predicted sensor values, etc.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the welding-type power supply 110 (e.g., to enable ease of replacement of the weld cable 226 in case of wear or damage). Furthermore, in some examples, welding data is provided with the weld cable 226 such that welding power and weld data are provided and transmitted together over the weld cable 226.

In some examples, the welding-type power supply 110 includes or is implemented in a wire feeder. The example communications circuitry 218 includes a receiver circuit 221 and a transmitter circuit 222. Generally, the receiver circuit 221 receives data transmitted by the robotic manipulator 106 and/or the robot control system 112, and the transmitter circuit 222 transmits data to the robotic manipulator 106 and/or the robot control system 112.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the controller 212 to enable, inhibit, or control gas flow (e.g., shielding gas) through the valve 230. Shielding gas exits the valve 230 and flows through a gas line 232 (which in some implementations may be packaged with the welding power output) to the wire feeder which provides the shielding gas to the welding application. In some examples, the welding-type power supply 110 does not include the gas supply 228, the valve 230, and/or the gas line 232.

The example robot control system 112 of FIG. 2 includes processor(s) 234, memory 236, one or more storage device(s) 238, power circuitry 240, communications circuitry 242, and one or more I/O device(s) 244.

The example processor(s) 234 execute instructions to configure and/or program a robotic welding procedure, and/or generates commands to execute a robotic welding procedure via the robotic manipulator 106. The processor(s) 234 may include one or more microprocessors, such as one or more "general-purpose" microprocessors, one or more special-purpose microprocessors and/or ASICS, and/or any other type of processing device. For example, the processor(s) 234 may include one or more digital signal processors (DSPs). The memory device 236 may include a volatile memory, such as random access memory (RAM), and/or a nonvolatile memory, such as read-only memory (ROM). The memory device 236 and/or the storage device(s) 238 may store a variety of information and may be used for various purposes. For example, the memory device 236 and/or the storage device(s) 238 may store processor executable instructions (e.g., firmware or software) for the processor(s) 234 to execute. In addition, one or more control regimes for various robotic manipulators and/or robotic welding procedures, along with associated settings and parameters, may be stored in the storage device(s) 238 and/or memory device 236. The storage device(s) 238 (e.g., nonvolatile storage) may include ROM, flash memory, a hard drive, and/or any other suitable optical, magnetic, and/or solid-state storage medium, and/or a combination thereof. The storage device(s) 238 store data (e.g., data corresponding to a welding application), instructions (e.g., software or firmware to perform welding processes), and/or any other appropriate data.

The power circuitry 240 converts input power to power usable by the robot control system 112 (e.g., by the processor(s) 234, the memory 236, the storage device(s) 238, communications circuitry 242, the I/O device(s) 244, and/or the robotic manipulator 106). Referring to FIG. 2, the robot control system 112 may be plugged into welding-type power supply 110 or the primary power 208 to provide operational power to the robot control system 112 and/or the robotic manipulator 106. In some examples, the power supply 110 includes auxiliary power output circuitry 246, which converts input power (e.g., output power from the power conversion circuitry 210, primary power 208) to auxiliary power, such as a standard AC output (e.g., 120 VAC or 240 VAC at 50 Hz or 60 Hz). In such examples, the robot control system 112 can be plugged into the power supply 110 instead of the primary power, and receives the auxiliary power via an auxiliary power connection (e.g., auxiliary power conductors 248 such as an AC power cord).

The example communications circuitry 218 and the communications circuitry 242 of FIG. 2 are configured to communicate via the auxiliary power connection. In examples in which the auxiliary power conductors 248 are configured to transmit 120 VAC power (or other high-voltage AC power), the communications circuitry 218 and the communications circuitry 242 may be configured to comply with the IEEE Standard 1901-2010 and/or any other power line communication standard or technique compatible with high-speed communication over the auxiliary power connection.

While establishment of communications may occur automatically using power line communications as in FIG. 2, the example welding-type power supply 110 and the robot control system 112 may also communicate via wireless communications. The example robot control system 112 and/or the power supply 110 may require initiation of pairing by the operator (e.g., via the user interface 214 and the I/O device(s) 244) to establish communication between the robot control system 112 and/or the power supply 110. For example, the operator may select a "Pair" button on each of the user interface 214 of the power supply 110 and a user interface of the robot control system 112, which then causes the communications circuitry 218 and the communications circuitry 242 to perform a pairing procedure. Upon establishing the communications channel via pairing, the power supply 110 and the robot control system 112 automatically exchange information and/or configure the power supply 110 as discussed above. In some examples, the operator may further be prompted to verify the pairing occurred between the desired power supply 110 and robot control system 112 (e.g., neither the power supply 110 nor the robot control system 112 paired with an unintended device nearby). While example powerline and wireless communications are disclosed above, the example robot control system 112 and the power supply 110 may be coupled using any communications method, including conventional methods such as a control cable.

The I/O device(s) 244 may include operator or user interfaces and/or other data interfaces. Example I/O device(s) 244 may include a keyboard, a keypad, a mouse, a trackball, a pointing device, a microphone, an audio speaker, a display device, an optical media drive, a multi-touch touch screen, a gesture recognition interface, a magnetic media drive, and/or any other operator interface devices to enable an operator to view information about the robot control system 112, the robotic manipulator 106, a robotic welding procedure, the connected power supply 110 and/or any other connected welding equipment, and/or any other information. For example, the I/O device(s) 244 may include input and/or output device(s) to control movement of the robotic manipulator 106, such as a teach pendant (e.g., a computing device executing software allowing the user to configure robotic welding procedures, welding parameters, and/or any other aspects of the robotic welding system 100) and/or dedicated programming devices positioned on the robotic manipulator 106 for use while guiding the robotic manipulator 106 in free drive mode. In other examples, the communications circuitry 242 may also include a communication interface to communicate with and control the robotic manipulator 106.

In some examples, the power supply 110 may be connected to the example robot control system 112 by plugging the robot control system 112 into the power supply 110 via the auxiliary power connection (e.g., a 120 VAC outlet on the power supply). While the power supply 110 is outputting the auxiliary output power and after the robot control system 112 is powered on and initialized, the power supply 110 and the robot control system 112 may automatically pair by communicating via the auxiliary power connection or the communications circuitry 218. To perform the pairing, the power supply 110 detects, via the communications circuitry 218, that the robot control system is coupled to the auxiliary power connection. For example, the communications circuitry 218 (and/or the communications circuitry 242) outputs messages via the auxiliary power connection, which are received and/or acknowledged by the communications circuitry 242 (or the communications circuitry 218).

In response to detecting the robot control system 112 via the auxiliary power connection and receiving communications from the robot control system 112, the controller 212 configures the welding-type power supply 110. For example, upon establishing communication between the robot control system 112 and the power supply 110, the power supply 110 may transmit to the robot control system 112 information that can be used to configure the power supply 110. The robot control system 112 can then provide commands to the power supply 110 to configure the power supply 110 to perform the desired welding processes as part of a robotic welding procedure.

Example information that may be automatically transmitted to the robot control system 112 by the power supply 110 may include an: identifier of a paired welding-type power supply (e.g., a serial number, an assigned name, etc.), an identification of capabilities of a paired welding-type power supply (e.g., a listing of features and/or modifiable parameters, a model number, etc.), software instructions to facilitate control of the welding-type power supply 110 by the robot control system 112 (e.g., a software application or plug-in, software updates, software routines, an API, etc.), identification of a welding capability of the welding-type power supply (e.g., a listing of available welding processes), identification of an adjustable parameter of the welding-type power supply (e.g., parameters that are typically used by an operator, parameters that are modifiable by typically hidden from the operator, robotic welding-specific parameters, etc.) identification of a parameter limitation of the welding-type power supply (e.g., voltage limits, current limits, power limits, wire feed speed limits, frequency limits, etc.), a robotic welding procedure and/or welding-type parameters to perform the robotic welding procedure (e.g., a stored, predefined set of instructions to be implemented by the robot control system 112 to perform a robotic welding procedure), and/or any other information that may be transferred between the power supply 110 and the robot control system 112. Additionally or alternatively, the welding-type power supply 110 may transmit one or more available real-time process data streams, such as welding current measurements, output voltage measurements, wire feed speed measurements. The robot control system 112 may use real-time process data streams for other aspects of the robotic welding procedure, such as process control, seam tracking, and/or any other control.

Additionally or alternatively, the welding-type power supply 110 may transmit information about physical system needs, such as the need for physical isolation or other physical configuration to be performed by the operator, to the robot control system 112. Based on the physical configuration information, the robot control system 112 may display the physical information to an operator via a display or otherwise notify the operator of the physical requirements. Additionally or alternatively, the welding-type power supply 110 may transmit system status information about one or more components of the welding system, for display by the robot control system 112 or other action. Example welding equipment system status information may include internal temperature measurements, airflow measurements, coolant circulation information, error codes and/or other diagnostic information, and/or any other status information.

Figure 3A:
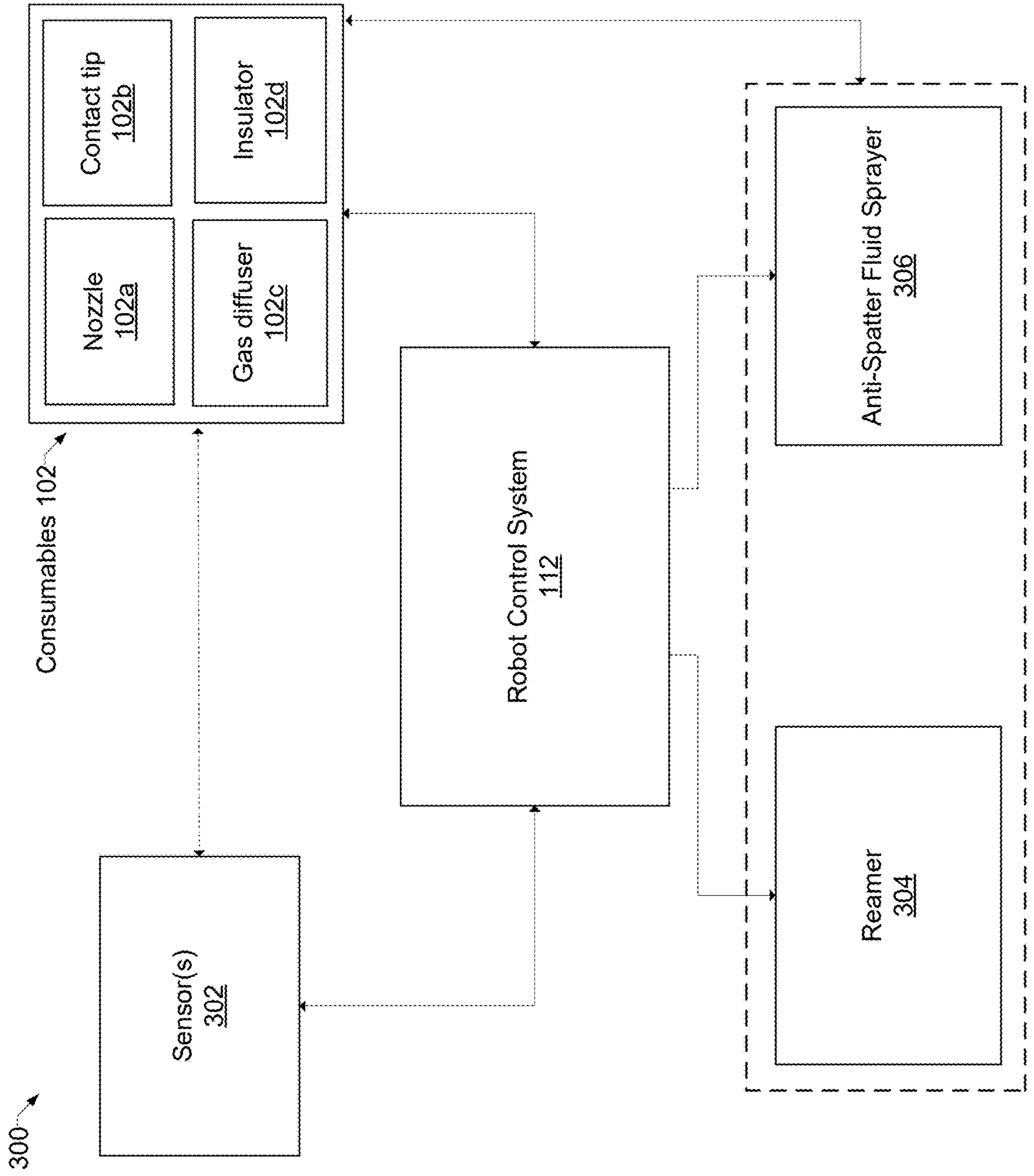
FIG. 3A illustrates an example block diagram of the welding torch consumables cleaning system, in accordance with aspects of this disclosure.
Figure 3B:
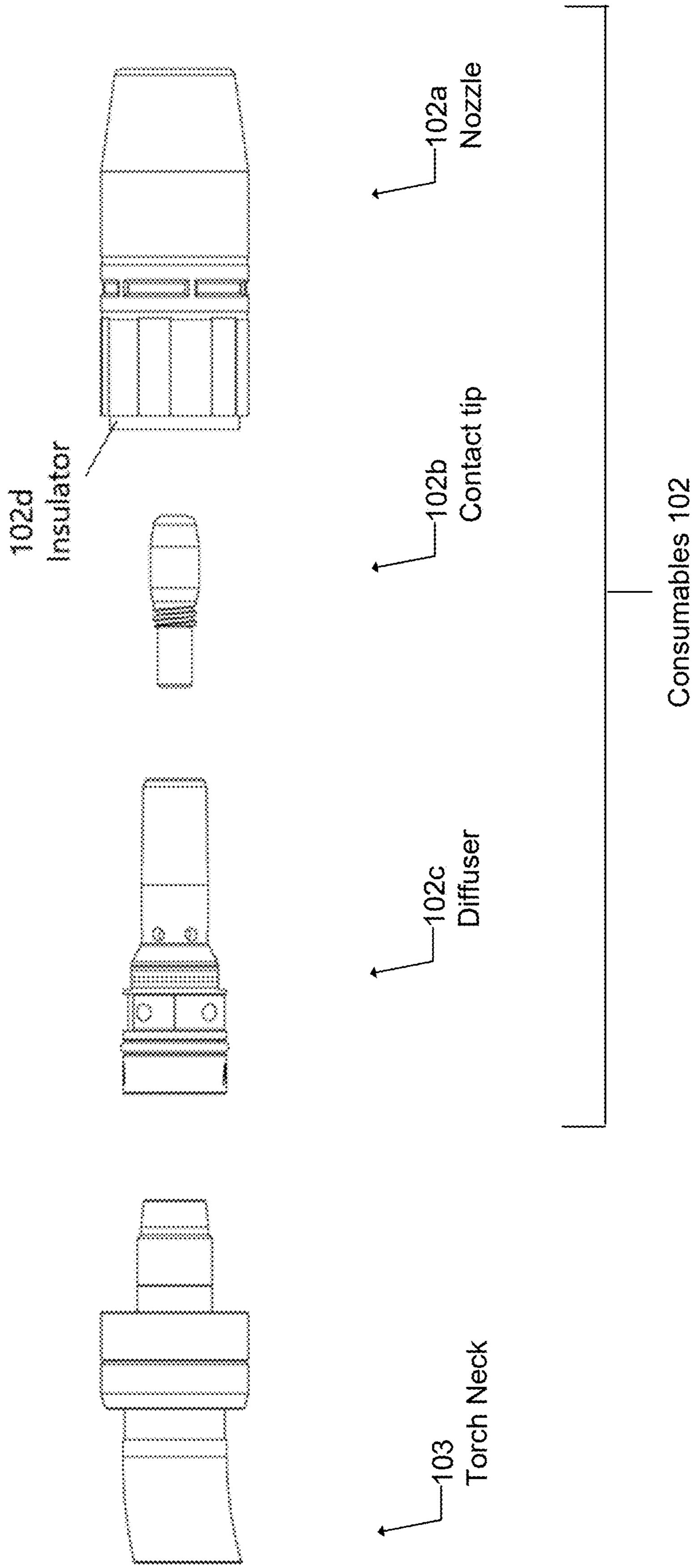
FIG. 3B illustrates example welding torch consumables, in accordance with aspects of this disclosure.

FIG. 3A is a block diagram 300 of an example welding torch consumables cleaning system configured to perform a cleaning operation on a welding torch 108. In some examples, the cleaning operation can be performed by a reaming apparatus (e.g., reamer 304) or both a reamer 304 and an anti-spatter fluid sprayer 306. The welding torch 108 may be manipulated by, for example, a robotic manipulator 106, a collaborative robot manipulator, or manually by a welding operator. The example welding torch 108 includes a torch neck 103 that is connected to consumables 102 which are generally subjected to spatter during welding operations, which can freeze and build up onto the consumables 102, thereby reducing welding quality over time. In some examples, the consumables 102 can include, for example, a nozzle 102*a*, a contact tip 102*b*, a gas diffuser 102*c*, and an insulator 102*d* as illustrated in FIG. 3B, and any other components near the nozzle 102*a* that accumulate spatter. Sensor(s) 302 may be used in the example torch consumables cleaning system 300 in order to determine whether a cleaning operation is needed for the consumables 102.

To remove spatter and/or reduce the adhesion of spatter on one or more of the welding consumables 102, the example welding torch 108 may be cleaned and/or conditioned by the welding torch consumables cleaning system 300. The example welding torch consumables cleaning system 300 includes the robot control system 112, one or more sensors 302, a reamer 304, and an anti-spatter fluid sprayer 306. The welding torch 108 may be sequentially moved by the robotic manipulator 106 to positions to perform the configured torch cleaning operations.

The example reamer 304 includes a motor and a bit (e.g., a blade or other cutting device), which removes spatter and/or other contaminants from the surface of the consumables 102 (e.g., nozzle 102*a*, contact tip 102*b*, gas diffuser 102*c*, insulator 102*d*) on the welding torch 108. The example anti-spatter fluid sprayer 306 sprays or otherwise deposits an anti-spatter fluid onto the interior and/or exterior of the consumables 102 and/or other portions of the welding torch 108 that may be adversely affected by the buildup of spatter. In some examples, the robot control system 112 may command the robotic manipulator 106 to position the consumables 102 to be cleaned by the reamer 304 and then spray the consumables 102 with the anti-spatter fluid spray at the anti-spatter fluid sprayer 306.

In some examples, the sensor(s) 302 may be different types of sensors, such as a camera, a gas pressure or gas flow sensor, a proximity sensor, a contact or touch sensor, or other sensors that may be used to detect spatter on the consumables 102 of the welding torch 108. In some examples, the welding torch consumables cleaning system may include one or more sensors 302 of each type. In some examples, different types of sensors may be included, or any combination thereof. In some examples, sensor measurements can be taken at a certain frequency, continuously, after a certain number of parts are welded, and/or after certain welding applications, etc. In some examples, sensor measurements can be stored in the one or more memory device(s) 236 and the one or more storage device(s) 238 and used to determine how often a sensor should perform a measurement, how often the robot control system 112 should command the system to perform a cleaning operation, etc. The sensor measurements may be included in a profile of the welding system, in a user profile, and/or a configuration profile etc. in order to customize the frequency of the cleaning operation. In some examples, the frequency of sensor measurements can be tracked and modified if the cleaning operation is commanded more than a certain deviation from the configured frequency. The frequency can be modified automatically based on collected sensor measurements, by machine learning, by an algorithm, and/or in response to a user command, as a list of non-limiting examples. In some examples, if more than one sensor is present, each sensor may have different frequencies for capturing measurements.

In some examples, the sensors 302 are used to measure characteristics of the consumables 102. The characteristics may be, for example, an amount of spatter, a size of an aperture at the consumables, the size of a blockage of an aperture, whether (a sufficient amount of) spatter is present, an amount of gas pressure, and/or an amount of gas flow, distance from the workpiece to the consumables, etc., as non-limiting examples. In some examples, the characteristics may be used to determine condition(s) of the welding consumables 102 of the welding torch 108.

In some examples, the threshold(s) and/or range of thresholds permitted may be configurable by a user and may vary based on the type of weld, welding procedure, welding application, etc. being performed. The threshold(s) or range of thresholds may also be modified based on machine learning algorithms that track welding usage information for a particular welding operation, a particular user, a particular welding machine, etc. and determine a threshold value or range of values for the characteristics, and/or a number of welding parts that should be made before a cleaning operation is commanded by the robot controller system 212. The threshold value or range of values may be configurable by a user and may vary based on the type of weld being performed. The threshold or range of thresholds may also be modified based on machine learning algorithms that track welding usage information for a particular welding operation, a particular user, a particular welding machine, a particular sensor, etc., and determine a threshold value or range of threshold values, a number of welding parts that may be completed before the cleaning operation is commanded, etc. Multiple thresholds and/or ranges of thresholds may be configured for the characteristics and/or the sensors, and each threshold and/or range of threshold may indicate different types of cleaning that may be performed. In some examples, a first threshold and/or range of thresholds may indicate to the robot control system 112 that cleaning should be performed after a welding procedure and/or program is completed. In some examples, a second threshold and/or range of thresholds may indicate that a welding procedure and/or program should be interrupted and/or reset. In some instances, a threshold and/or range of thresholds may indicate that the robot welding system 100 should be reset.

Figure 4:
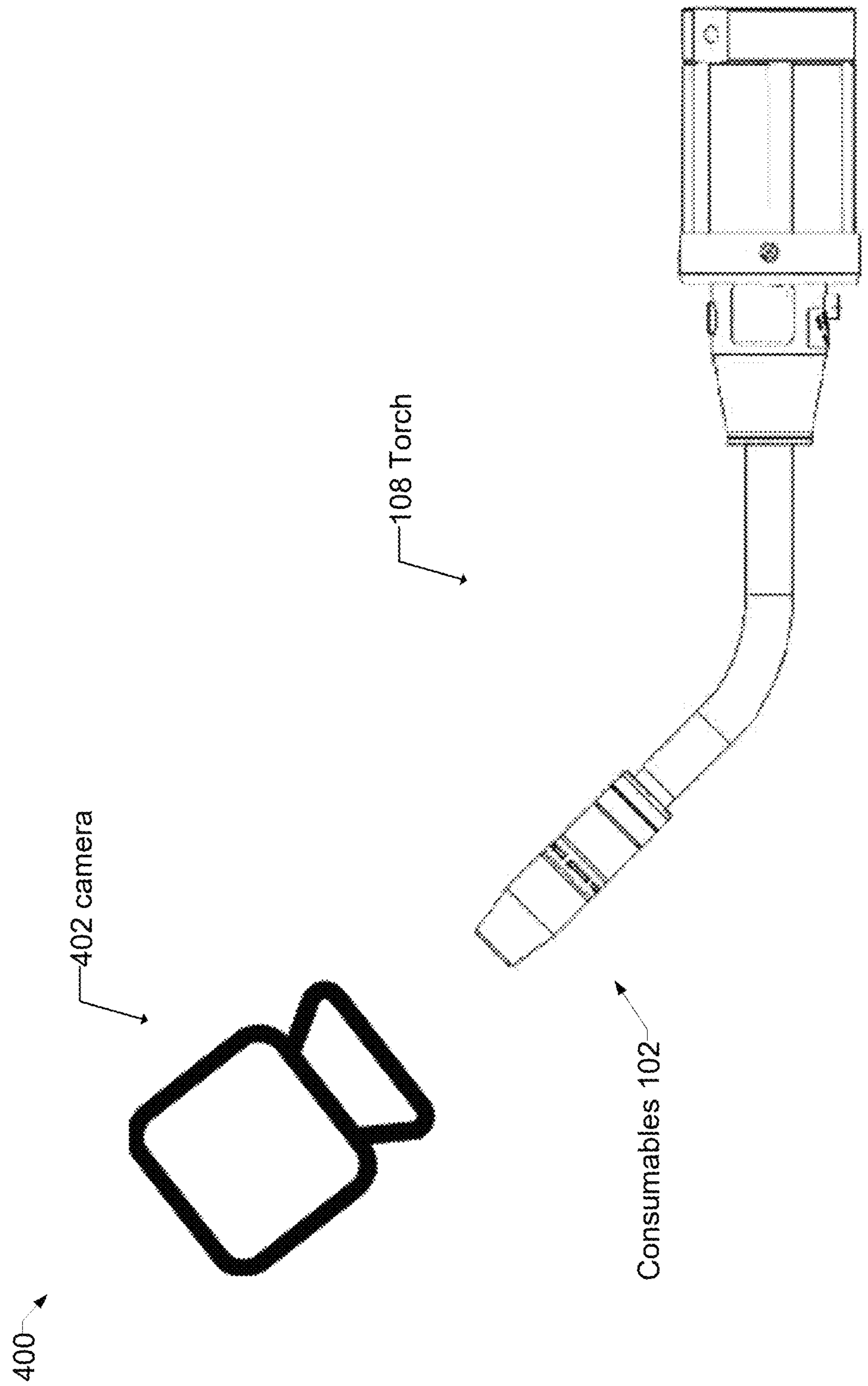
FIG. 4 illustrates an example welding torch consumables cleaning system in accordance with aspects of this disclosure including a camera sensor.

FIG. 4 illustrates an example welding consumables cleaning system 400 in accordance with aspects of this disclosure including one or more camera sensor(s) 402. In some examples, the camera(s) may include one or more adjustable lenses, filters, and/or other optical components for capturing electromagnetic waves in one or more spectra, such as, for example, thermal, infrared, visible, ultraviolet, as non-limiting examples. In some examples, the camera(s) may implement stereoscopic tracking and/or capture stereoscopic images. In some examples, the camera(s) 402 may be used to observe conditions of the consumables 102, such as the nozzle 102*a*, contact tip 102*b*, diffuser 102*c*, and insulator 102*d*. In some examples, the camera 402 may capture one or more reference images of one or more consumables 102 and compare subsequent images of the consumable(s) 102 to the reference image(s). The images may be stored in the one or more memory device(s) 236 and the one or more storage device(s) 238 as described above with regards to FIG. 2.

In some examples, the camera 402 and/or the torch 108 may be positioned by the robotic manipulator 106, by another robotic system, and/or by an operator to capture images of the object or features at a preprogrammed, fixed distance from the consumables 102. In some examples, the camera 402 may be positioned by the robotic manipulator 106 to capture a certain portion of the consumables 102, such as the nozzle 102*a*, the contact tip 102*b*, the gas diffuser 102*c*, and the insulator 102*d*. For example, the robotic manipulator 106 can be programmed to capture the aperture of the nozzle 102*a* or other consumables 102. In some examples, the camera 402 may be positioned in a downward facing direction and/or include an enclosure to protect the camera from dust, debris, or other matter that can cause buildup on the camera lens or other camera components. The enclosure may also help provide a high-contrast background in order for differences in the captured images to be more apparent. In some examples, the high contrast background allows measurements between different images of the objects or features to be clearer and therefore more accurate. In some examples, the camera 402 and the camera enclosure may have different-sized apertures to facilitate capturing images of objects or features of varying shapes and sizes.

In some examples, the camera 402 may be configured to capture images for comparison of characteristics at a certain frequency, such as after welding every 5 parts, 20 parts, 50 parts, etc. continuously (e.g. video), or after a certain amount of time. In some examples, the camera(s) 402 may be configured to capture images based on a triggering event. For example, the triggering event may be when a gate of a welding cell including the welding system opens or closes, when one of the consumables 102 is replaced, or when there is another change to one of the consumables 102. In some examples, a cycle counter may be used to determine how often the image of the consumables 102 should be captured.

In some examples, a spatter collection rate may be calculated and used to determine the frequency at which the camera will capture images of the consumables 102. The spatter collection rate may be an observed collection rate detected in the captured images or may be a rate set by the user. In some examples, the frequency of the captured images may be modified based on the observed collection rate and subsequently increased or decreased. In some examples, a threshold or range of thresholds may be set for the spatter collection rate. For example, if there is a deviation from the spatter collection rate above a certain threshold or range of thresholds, the robot control system 112 may command the robot manipulator 106 to perform a cleaning operation on the consumables 102. In some examples, the threshold of the spatter collection rate can be a deviation of approximately 20% or more, depending on the welding type and/or application. In some examples, the change or a rate of change in the observed collection rate of the spatter in the captured images may indicate that a cleaning operation should be performed on the consumables 102. In some examples, the spatter collection rate can be tracked over time or based on usage or number of parts completed, and the rate can be modified based on observed usage over time.

In some examples, one or more reference images are captured in order to establish a baseline value of one of more characteristics of the consumables 102. In some examples, any previously captured image may be designated as a reference image. In some examples, the camera 402 may calculate values of the characteristics from the reference images and the subsequent images and make a comparison of those values in order to determine whether the characteristics of the consumables 102 remain within a threshold range. In some examples, the characteristics may be, for example, a size of a nozzle opening, an amount of spatter on the consumables 102, a distance from one or more of the consumables 102 to the workpiece 114, etc. In some examples, values can be calculated from the characteristics. In some examples, a reference point is established inside an aperture of the nozzle 102*a* or other consumables 102, and properties of the aperture are measured, such as number of pixels within the aperture, number of pixels outside of the aperture, the width of the aperture, or the radius of the aperture, etc. Two or more images may be compared to one another, such that characteristics can be compared over a period of time to gauge changes in a condition of the consumables 102.

In some examples, one or more reference images may be captured of an aperture of a clean nozzle 102*a*. Subsequent images can be taken of the nozzle 102*a* and once a certain blockage is achieved (i.e. once a threshold blockage is reached), as determined from the subsequent images, the robot control system 112 may command the robot manipulator 106 to perform a cleaning operation. The threshold blockage value or range of values may be configurable by a user and may vary based on the type of weld being performed. The threshold or range of thresholds may also be modified based on machine learning algorithms that track welding usage information for a particular welding operation, a particular user, a particular welding machine, etc. and determine a threshold value or range of values for spatter, a number of welding parts that should be made before cleaning operation is commanded, etc. In some examples, the camera(s) may capture images and perform cleaning based on the characteristics reaching the threshold or range(s) of thresholds.

In some examples, one or more reference images may be captured of a clean nozzle may have a distance of d1 from a workpiece based on measurements taken from the camera(s). After a number of welding operations are performed, spatter is accumulated on the consumables 102. Based on measurements from the proximity sensor, the robot control system 112 determines that the distance between the spatter covered nozzle and the workpiece has decreased. If the amount of decrease meets the threshold values for invoking a cleaning operation, the robot control system 112 commands the robotic manipulator to perform a cleaning operation. If the distance has not decreased enough to meet the threshold values for invoking a cleaning operation, welding operations will continue and camera sensor measurements may continue to be recorded at a certain frequency, until sufficient spatter has accumulated to meet the threshold value or range of values. Once the threshold has been met, the robot control system 112 commands the cleaning operation. In some examples, the distance between the consumables and the workpiece can be measured using other sensors, such as an optical sensor, a camera, a laser, and/or a magnetic sensor, as a list of non-limiting examples. Other properties of the consumables may be measured, such as conductivity, thermal signature, magnetic properties, resistance, and/or inductance, etc.

Figure 5:
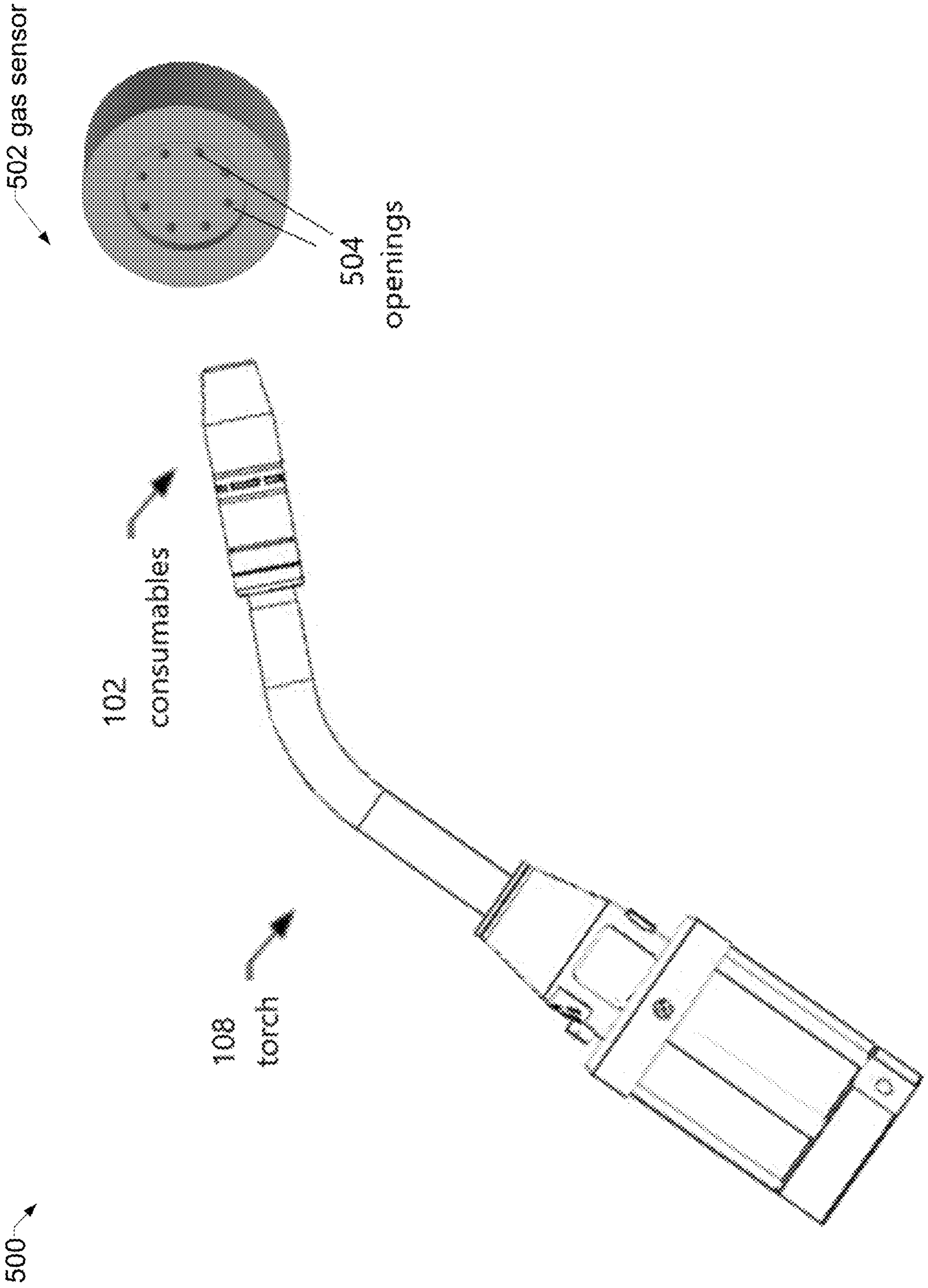
FIG. 5 illustrates an example welding torch consumables cleaning system in accordance with aspects of this disclosure including a gas sensor.

FIG. 5 illustrates an example welding consumables cleaning system in accordance with aspects of this disclosure including a gas sensor 502. In some examples, the gas sensor 502 may be a gas pressure sensor or a gas flow sensor configured to measure gas flow or gas pressure. In some examples, the gas pressure sensor or the gas flow sensor is located in a power pin, a cable, on a reaming apparatus 304, near the reaming apparatus 304, or near tooling. In some examples, the gas sensor may be a disc-type sensor comprising openings 504 through which gas pressure or gas flow may be measured. In some examples, gas pressure may be measured within each opening 504 of the disc. In some examples, the gas flow measurements within each opening 504 may be used to determine if the gas flow is uniform across the gas sensor 502 and through the openings 504. In some examples, the memory 224 is configured to store the gas flow or gas pressure values obtained by the gas flow or gas pressure sensor, as well as reference gas flow values. In some examples, the robot control system 112 is configured to command a cleaning operation of the consumables 102 if the gas flow or the gas pressure violates the one or more thresholds for a predetermined period of time. In some examples, when the gas flow or gas pressure is above a threshold or range of thresholds, a signal is sent to the robot control system 112 to signal that a cleaning operation is required. The robot control system 112 then sends a command to the robotic manipulator 106 to perform a cleaning operation.

Figure 6:
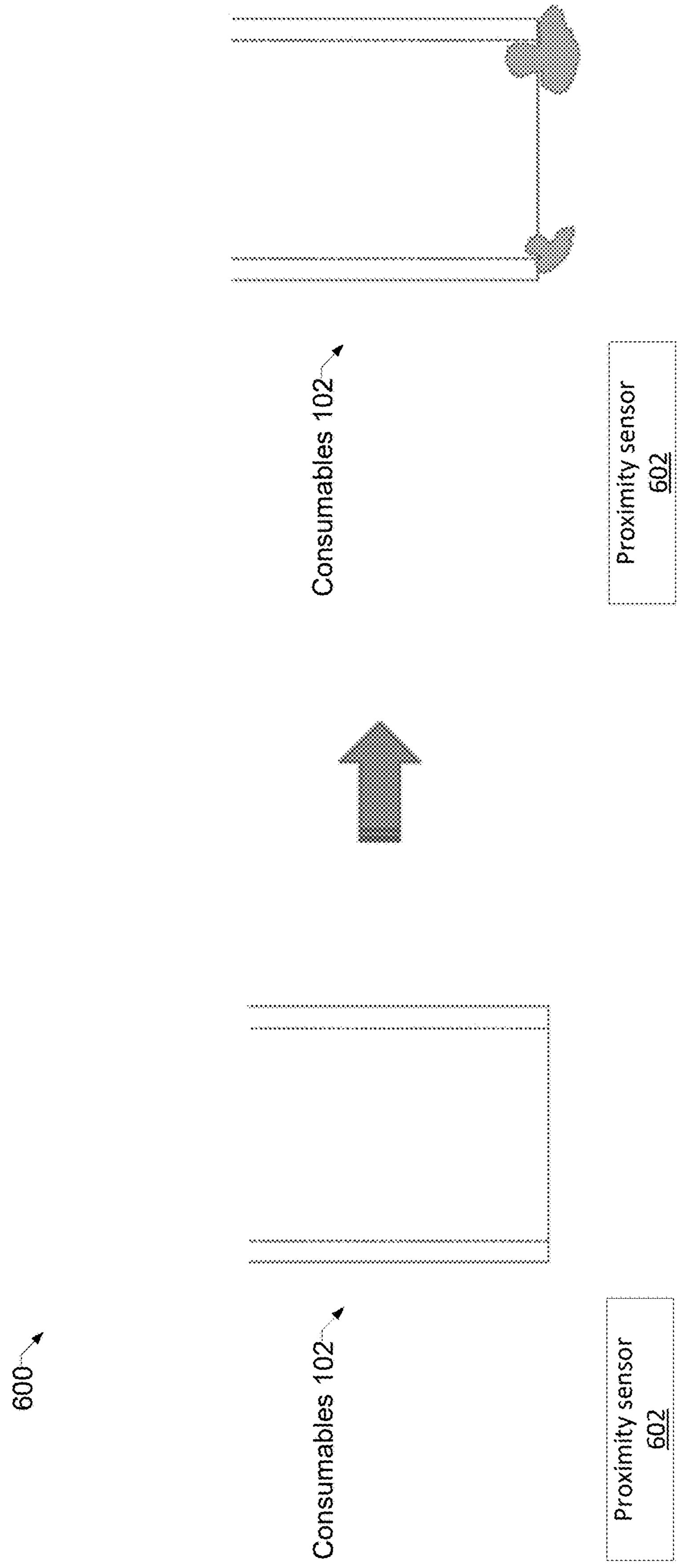
FIG. 6 illustrates an example welding torch consumables cleaning system in accordance with aspects of this disclosure including a proximity sensor.

FIG. 6 illustrates an example welding consumables cleaning system 600 including at least one proximity sensor 602, in accordance with aspects of this disclosure. In some examples, the sensor is a ferrous proximity sensor, an inductive proximity sensor, and/or a Hall sensor configured to detect spatter on the consumables. In some examples, the ferrous proximity sensor or the inductive proximity sensor is an analog sensor and uses a low voltage threshold of 0 to 10 volts. In some examples, as spatter accumulates, the proximity sensor 602 detects the increase in spatter, and once there is sufficient spatter, transmits a signal to the robot control system 112 to indicate the conditions exist to initiate a cleaning operation. The amount of spatter can be measured by the proximity sensor 602. For example, a clean nozzle would not have any spatter to be sensed by the proximity sensor. After a number of welding operations are performed, spatter is accumulated on the consumables 102. If the proximity sensor 602, determines that the amount of spatter meets the threshold values for invoking a cleaning operation, the proximity sensor 602 sends a signal to the robot control system 112 which commands the robotic manipulator 106 to perform a cleaning operation. If the amount of spatter, as measured by the proximity sensor, does not meet the threshold values for invoking a cleaning operation, welding operations will continue and proximity sensor measurements may continue to be recorded at a certain frequency, until sufficient spatter has accumulated to meet the threshold value or range of values. Once the threshold has been met, the robot control system 112 commands the cleaning operation.

Figure 7A:
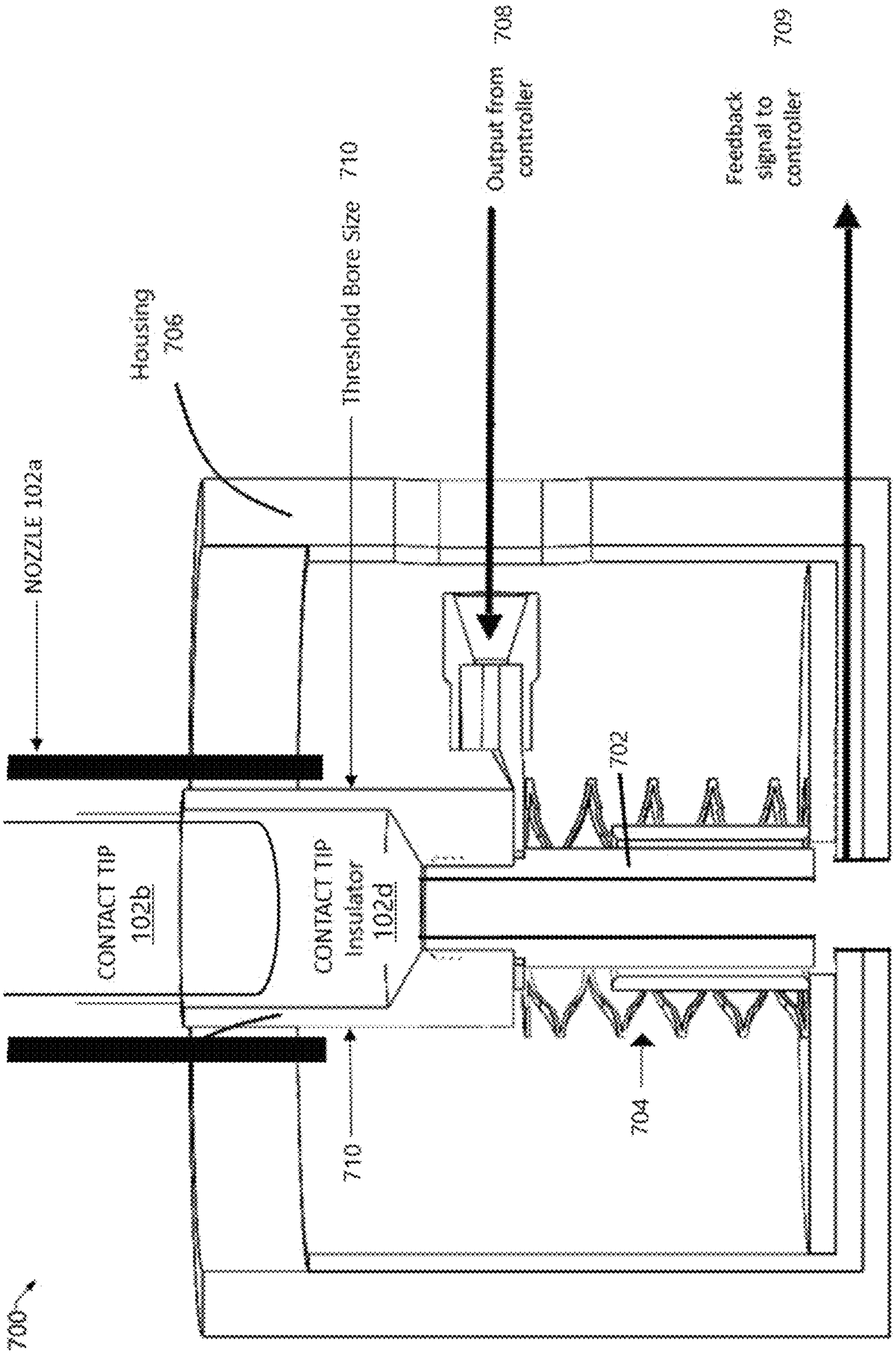
FIG. 7A-7C illustrate an example welding torch consumables cleaning system in accordance with aspects of this disclosure including a contact sensor.
Figure 7B:
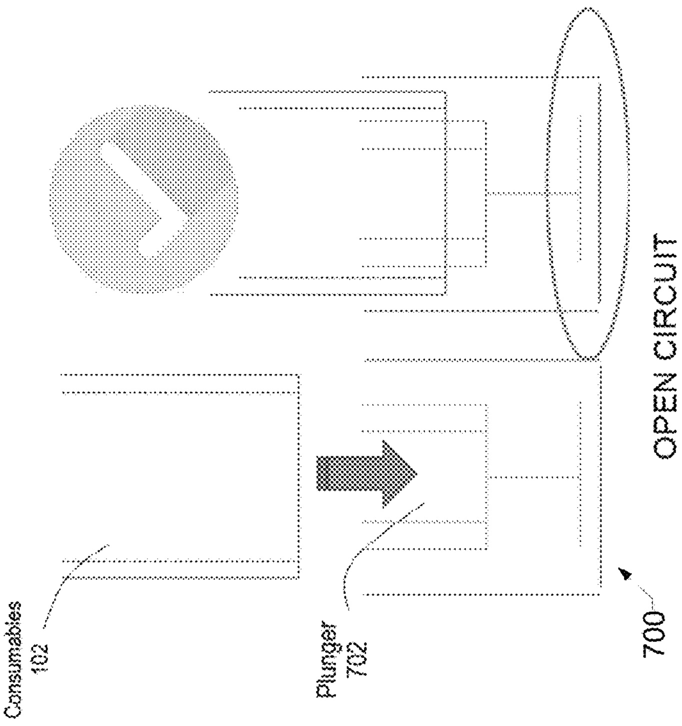
Figure 7C:
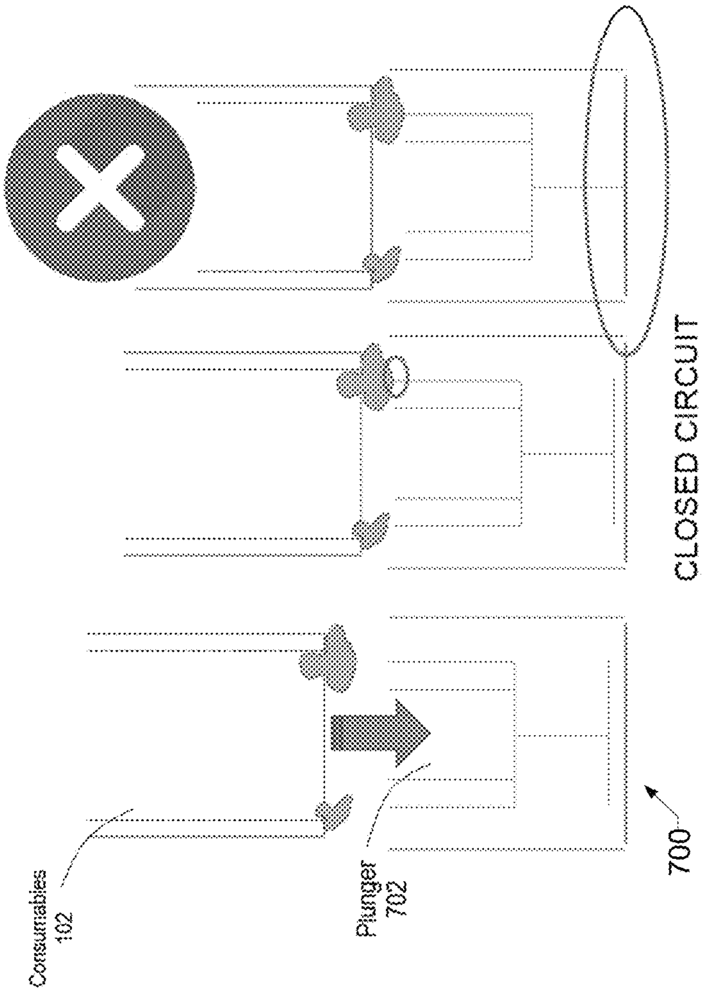

FIG. 7A-7C illustrate an example welding consumables cleaning system including a touch sensor or contact sensor 700. In some examples, the contact sensor 700 comprises a plunger 702 and a biasing element or spring 704. In some examples, the spring 704 is a wave spring. In some examples, the contact sensor 700 is encased in a housing 706. In some examples, when spatter is not detected at the consumables 102, such as the nozzle 102*a*, contact tip 102*b*, and/or insulator 102*d*, the plunger 702 plunges down to a known point without closing, which is an indication that welding can continue without risking porosity as depicted in FIG. 7B. In some examples, the plunger 702 includes an allowable size for the contact tip 710. In some examples, a bore smaller than the threshold/allowable size 710 will trigger the switch to close as depicted in FIG. 7C. In some examples, the insulator 102*d* will clear the plunger 702 and the plunger 702 will not close, as depicted in FIG. 7B. In some examples, if interference is being caused by spatter accumulation on the consumables 102, the plunger 702 will plunge down and exert a force on the spring 704, causing the switch to close. In some examples, an output signal 708 is sent from the robot control system 112 and when a switch is closed, a feedback signal 709 is sent back to the robot control system 112. FIG. 7C depicts an example of a closed switch. A closed switch indicates a cleaning operation is needed, and a feedback signal 709 is sent back to the robot control system 112 which in turn commands the robotic manipulator 106 to perform a cleaning operation. In some examples, the feedback signal 709 is a 24 volt signal.

In some examples, the contact sensor 700 will check at certain intervals, for example, after welding every part, after welding 10 parts, 20 parts, 100 parts, etc. In some examples, the frequency at which the contact sensor 700 sends a signal may be tracked and stored in the one or more memory device(s) 236 and the one or more storage device(s) 238. In some embodiments, the frequency at which the contact sensor 700 is checked may be customized via machine learning by updating the frequency based on how often the cleaning operation is invoked by the contact sensor 700, how often spatter is accumulated, etc.

Figure 8:
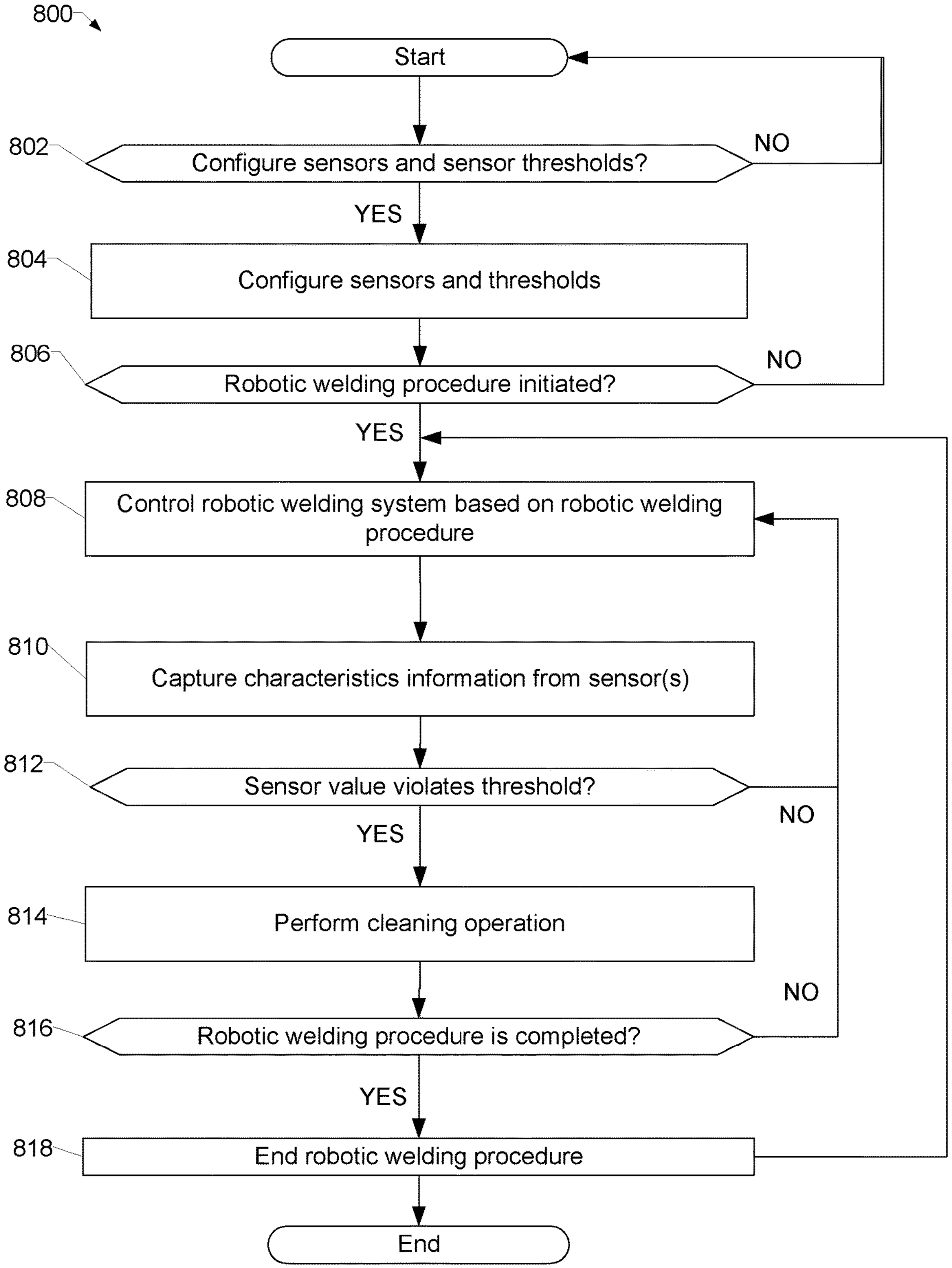
FIG. 8 illustrates an example welding torch consumables cleaning system flowchart, in accordance with aspects of this disclosure.

FIG. 8 illustrates an example welding consumables cleaning system flowchart 800, in accordance with aspects of this disclosure. The example instructions 800 may be executed by, for example, the processor(s) 234 of FIG. 2. At block 802, the example robot control system 112 (e.g., via the processor(s) 234) determines whether sensor(s) and sensor thresholds are being configured. For example, the robot control system 112 may determine whether a programming device or other input device is being used to configure the sensor(s) 302. If the robot welding system 100 and sensor(s) 302 are being configured (block 802), at block 804 the robot control system 112 configures the sensor(s) and sensor thresholds, including storing reference images, threshold values, threshold range values, calibrating the sensor(s), etc.

If the sensor(s) are not being configured (block 802), or when the sensor(s) have been configured (block 804), at block 806 the robot control system 112 determines whether a robotic welding procedure has been initiated. The robotic welding procedure may be configured as an intermediate step or may have been previously configured, and the robotic welding procedure may be initiated based on an operator input (e.g., via the I/O device(s) 244), by securing of a clamp to hold the workpiece 114, and/or any other desired initiation input. If a robotic welding procedure has not been initiated (block 806), control returns to block 802 to continue configuration of the sensor(s).

When the robotic welding procedure has been initiated (block 806), at block 808 the robot control system 112 controls the robotic welding system 100 (e.g., the robotic manipulator 106, the power supply 110, the wire feeder 140, the shielding gas 142, and/or other equipment) based on the robotic welding procedure. For example, the robot control system 112 may provide commands based on instructions in the robotic welding procedure.

At block 810, the robot control system 112 captures characteristics information from the sensor(s). At block 812, the robot control system 112 determines whether any sensor values are above the thresholds values configured at block 804. For example, the robot control system 112 may continuously monitor captured sensor information or may check captured sensor information at a certain rate. If a sensor has not been identified that violates a threshold or range of thresholds (block 812), control returns to block 808 to continue controlling the robotic welding system 100.

When a sensor that violates a threshold is identified (block 812), at block 814 the robot control system 112 controls the robotic manipulator 106 to perform a cleaning operation. In other examples, the robot control system 112 may also provide a notification(s) to personnel. The notification(s) may be via any type of audible, visual, haptic, tactile, and/or other perceptible feedback, and may be individually applied (e.g., selectively provided to personnel who may be in proximity or otherwise affected, such as by a personal device) or broadly applied (e.g., output to anyone close enough to perceive the notification).

At block 816, the robot control system 112 determines whether the robotic welding procedure is completed. If the robotic welding procedure is not completed, the robotic welding system 100 continues to perform welding per the robotic welding procedure at 808. When welding is completed (block 816), at block 818 the robot control system 112 ends the robotic welding procedure. The example instructions 800 then end.

As utilized herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system for cleaning consumables of a welding torch, comprising:

one or more sensors configured to monitor one or more conditions of one or more consumables of the welding torch, the one or more sensors comprising a camera configured to obtain one or more images at a predetermined frequency or based on a triggering event, the predetermined frequency being configured to be modified based on an observed collection rate, or the triggering event comprising a part change, a gate opening or closing, or a replacement of the one or more consumables; and control circuitry configured to:

receive feedback corresponding to the one or more conditions of the one or more consumables from the one or more sensors;

compare the feedback to one or more thresholds corresponding to the one or more conditions, wherein the one or more thresholds comprise a first threshold and a second threshold that is different from the first threshold;

command the system to perform a cleaning operation on the one or more consumables after a welding procedure or a welding program has been completed in response to the feedback violating the first threshold, and command the system to interrupt or reset the welding procedure or the welding program in response to the feedback violating the second threshold.

2. The system of claim 1, wherein the control circuitry is further configured to command the system to perform a reaming process or a spatter removal process on the one or more consumables of the welding torch.

3. The system of claim 1, wherein the control circuitry is further configured to command the system to perform a reaming process followed by an anti-spatter application on the one or more consumables.

4. The system of claim 1, further comprising a memory configured to store values obtained by the one or more sensors and reference values for the one or more sensors.

5. The system of claim 1, wherein the comparison comprises comparing values obtained from the one or more images of the one or more consumables to threshold values.

6. The system of claim 1, wherein the camera is configured to obtain the one or more images at the predetermined frequency, and the observed collection rate comprises an observed spatter collection rate.

7. The system of claim 1, wherein the camera is configured to obtain the one or more images in response to the triggering event.

8. The system of claim 1, wherein the camera is configured to obtain one or more reference images, and the comparison comprises comparing one or more subsequent images of the one or more consumables to the one or more reference images to determine whether the one or more thresholds have been violated.

9. A welding system, comprising:

a welding torch including one or more welding consumables;

one or more sensors configured to monitor one or more conditions of the one or more welding consumables, the one or more sensors comprising a camera configured to obtain one or more images at a predetermined frequency or based on a triggering event, the predetermined frequency being configured to be modified based on an observed collection rate, or the triggering event comprising a part change, a gate opening or closing, or a replacement of the one or more consumables;

a cleaning system configured to perform a cleaning operation on the one or more welding consumables; and control circuitry configured to:

receive feedback corresponding to the one or more conditions from the one or more sensors;

compare the feedback to one or more thresholds corresponding to the one or more conditions, wherein the one or more thresholds comprise a first threshold and a second threshold that is different from the first threshold;

command the system to perform a cleaning operation on the one or more consumables after a welding procedure or a welding program has been completed in response to the feedback violating the first threshold, and command the system to interrupt or reset the welding procedure or the welding program in response to the feedback violating the second threshold.

10. The welding system of claim 9, wherein the cleaning operation comprises a reaming process, a spraying process, or a spatter removal process on the one or more welding consumables.

11. A robotic welding system, comprising:
a welding torch including one or more welding consumables;
a cleaning system configured to perform a cleaning operation on the one or more welding consumables;
one or more sensors configured to monitor one or more conditions of the one or more welding consumables, the one or more sensors comprising a camera configured to obtain one or more images at a predetermined frequency or based on a triggering event,
the predetermined frequency being configured to be modified based on an observed collection rate, or the triggering event comprising a part change, a gate opening or closing, or a replacement of the one or more consumables; and
robot control circuitry configured to:
receive feedback corresponding to the one or more conditions from the one or more sensors;
compare the feedback to one or more thresholds corresponding to the one or more conditions, wherein the one or more thresholds comprise a first threshold and a second threshold that is different from the first threshold;
command the system to perform a cleaning operation on the one or more consumables after a welding procedure or a welding program has been completed in response to the feedback violating the first threshold, and
command the system to interrupt or reset the welding procedure or the welding program in response to the feedback violating the second threshold.

12. The robotic welding system of claim 11, the robot control circuitry further configured to command the cleaning system to perform the cleaning operation on the one or more welding consumables.

* * * * *